US012136508B2

(12) United States Patent
Sanchez Llamazares et al.

(10) Patent No.: US 12,136,508 B2
(45) Date of Patent: Nov. 5, 2024

(54) IRON-RHODIUM MAGNETOCALORIC ALLOY RIBBONS FOR HIGH PERFORMANCE COOLING-HEATING APPLICATIONS AND PROCESS FOR MANUFACTURING THE SAME

(71) Applicants: Instituto Potosino de Investigación Cientifica y Tecnológica A.C., San Luis Potosi (MX); Universidad Autonoma de Ciudad Juarez, Chihuahua (MX)

(72) Inventors: Jose Luis Sanchez Llamazares, San Luis Potosi (MX); Cesar Fidel Sanchez Valdes, Chihuahua (MX); Maria de Lourdes Arreguin Hernandez, Guanajuato (MX); Mauricio Lopez Cruz, San Luis Potosi (MX)

(73) Assignees: Instituto Potosino de Investigación Científica y Tecnológica A.C., San Luis Potosí (MX); Universidad Autonoma de Ciudad Juarez, Chiuhuahua (MX)

( * ) Notice: Subject to any disclaimer, the term of this patent is extended or adjusted under 35 U.S.C. 154(b) by 761 days.

(21) Appl. No.: 17/023,608

(22) Filed: Sep. 17, 2020

(65) Prior Publication Data

US 2022/0084728 A1 Mar. 17, 2022

(51) Int. Cl.
*H01F 1/01* (2006.01)
*C22C 5/04* (2006.01)
*H01F 41/02* (2006.01)

(52) U.S. Cl.
CPC ............... *H01F 1/015* (2013.01); *C22C 5/04* (2013.01); *H01F 41/02* (2013.01)

(58) Field of Classification Search
None
See application file for complete search history.

(56) References Cited

U.S. PATENT DOCUMENTS

| | | | | |
|---|---|---|---|---|
| 3,607,460 A * | 9/1971 | Lommel | ................ | B82Y 25/00 148/108 |
| 2020/0388750 A1 * | 12/2020 | Mei | ........................ | H10B 61/00 |

OTHER PUBLICATIONS

Chirkova et al. "Giant adiabatic temperature change in FeRh alloys evidenced by direct measurements under cyclic conditions" Acta Materialia 106 (2016) 15-21 https://dx.doi.org/10.1016/j.actamat.2015.11.054 (Year: 2016).*

(Continued)

*Primary Examiner* — Alexandra M Moore
(74) *Attorney, Agent, or Firm* — Defillo & Associates, Inc.; Evelyn A. Defillo

(57) ABSTRACT

A polycrystalline magnetocaloric material based on thermally annealed $Fe_{100-x}Rh_x$ melt-spun ribbons with chemical composition x in the interval 48≤x≤52 at. % and the bcc CsCl-type crystal structure (B2) and method for manufacturing the same. The material has improved magnetocaloric properties associated to first-order magneto-elastic phase transition compared to bulk alloys of similar chemical composition manufactured by conventional melting techniques; exhibiting both low-magnetic field induced giant magnetocaloric effects and enhanced refrigeration capacity close to the room temperature range, due to the fast increase of a magnetic entropy change at low fields that is followed by a broad table-like magnetic entropy change as function in the temperature curve. The material is useful as a working substance for the applications involving heating or cooling upon the removal or application of an external magnetic field, such as magnetocaloric refrigeration, heat exchangers, controllable delivery and release of bio-active substances (Continued)

imbedded in a thermo-sensitive polymer and local heating which destroy malignant neoplasms.

8 Claims, 5 Drawing Sheets

(56) References Cited

OTHER PUBLICATIONS

Chirkova et al. "The effect of the microstructure on the antiferromagnetic to ferromagnetic transition in FeRh alloys" Acta Materialia 131 (2017) 31-38 http://dx.doi.org/10.1016/j.actamat.2017.04.005 (Year: 2017).*
A.M. Tishin, Y.I. Spichkin, V.I. Zverev, P.W. Egolf, Int. J. Refrig., vol. 68 (2016) 177-186.
S.A Nikitin, G. Myalikgulyev, A.M. Tishin, M.P. Annaorazov, A.L. Tyurin, Phys. Lett. A, vol. 148 (1990) 363-366.
M.P. Annaorazov, K.A. Asatryan, G. Myalikgulyev, S.A. Nikitin, A.M. Tishin, A.L. Tyurin, Cryogenics, vol. 32 (1992) 867-872.
E. Stem-Taulats, A. Planes, Phys. Rev. B, vol. 89 (2014) 214105.
Enric Stern-Taulats, Adrià Gràcia-Condal, Antoni Planes, Pol Lloveras, Maria Barrio, Josep-Lluís Tamarit, Sabyasachi Pramanick, Subham Majumdar, Lluís Mañosa, Appl. Phys. Lett., vol. 107 (2015) 152409.
A. Chirkova, K.P. Skokov, L. Schultz, N.V. Baranov, O. Gutfleisch, T.G. Woodcock, Acta Materialla, vol. 106 (2016) 15-21.
Enric Stem-Taulats, Antoni Planes, Pol Lloveras, Maria Barrio, Josep-Lluís Tamarit, Sabyasachi Pramanick, Subham Majumdar, Carlos Frontera, Lluís Mañosa, Phys. Rev. B, vol. 89 (2014) 214105.
A. I. Zakharov, A. M. Kadomtseva, R. Z. Levitin, E. G. Ponyatovskil, Sov. Phys. JETP, vol. 19 (1964) 1348].
J.L. Swartzendruber, Bull. Alloy Phase Diag., vol. 5 (1984) 456-462].
V.I. Zverev, A.M. Saletsky, R.R. Gimaev, A.M. Tishin, T. Miyanaga, J.B. Staunton, Appl. Phys. Lett., vol. 108, (2016) 192405.
A. Chirkova, F. Bittner, K. Nenkov, N. V. Baranov, L. Schultz, K. Nielsch, T. G. Woodcock, Acta Materialia, vol. 131 (2017) 31-38].
Radhika Barua, Félix Jiménez-Villacorta, L.H. Lewis, J. Appl. Phys., vol. 115 (2014) 17A903.
M. Balli, D. Fruchart, D. Gignoux, A. Yekini, Negative magnetocaloric effect in Fe1-xRhx compounds, ICMR (2007).
Meghmalhar Manekar, S.B. Roy, J. Phys. D: Appl. Phys., vol. 41 (2008) 192004.
A. Quintana-Nedelcos, J.L. Sánchez Llamazares, C.F. Sánchez-Valdés, P. Álvarez Alonso, P. Gorria, P. Shamba, N.A. Morley, J. Alloys Compd., vol. 694 (2017) 1189-1195.
M.E. Wood, W.H. Potter, Cryogenics, vol. 25 (1985) [667-683].

* cited by examiner

IRON-RHODIUM MAGNETOCALORIC ALLOY RIBBONS FOR HIGH PERFORMANCE COOLING-HEATING APPLICATIONS AND PROCESS FOR MANUFACTURING THE SAME

FIELD OF THE INVENTION

The instant invention is related to the advanced materials area, specially to alloys exhibiting remarkable magnetocaloric and mechano-caloric effects which were associated to their first order phase transition.

BACKGROUND OF THE INVENTION

Magnetic materials that undergo a significant increase or decrease, in temperature upon the application or removal of an external magnetic field in the temperature region in which a first- or second-order phase transition has been experienced, referred as magnetocaloric materials, can be used to develop coolers and heaters their temperature they can exchange heat with their immediate environment. In view of that, they find applications in a new cooling technology referred as magnetic refrigeration, as heaters or in modern medicine:

a) Magnetic refrigeration is a solid-state cooling refrigeration technology under development worldwide based on the magnetocaloric effect (MCE). In comparison with conventional refrigeration technology, based on the compression/expansion of gases (Joule-Thomson effect), magnetic refrigeration can be up to 30% more energy efficient and does not directly contaminate the environment. Thus, it is more economically convenient and eco-friendly. For magnetic refrigeration purposes, the maximum values of magnetic entropy $|\Delta S_M^{peak}|$ and adiabatic temperature $\Delta T_{ad}^{max}$ changes, together with the refrigerant capacity RC, being the main figures of merit that characterize a magnetocaloric material. Whereas $\Delta T_{ad}$ characterizes the driving force for heat transfer between the cold and hot sinks, RC measures the amount of heat that the refrigerant can transfer from the cold to the hot sinks during an ideal refrigeration cycle. In practice, for a given material and value of the magnetic field change $\mu_o\Delta H$, RC is determined by the magnitude of $\Delta S_M$ and the working temperature range of the refrigerant, usually given by the full-width at a half-maximum $\delta T_{FWHM}$ of the $\Delta S_M$ (T) curve. Thus, a large refrigerant capacity depends on having a large maximum magnetic entropy change $|\Delta S_M^{peak}|$ and a broad $\Delta S_M$(T) curve (i.e., a large $\delta T_{FWHM}$) in the phase transition region. In addition, for refrigeration systems to be able to work in a given temperature a span a table-like shaped $\Delta S_M$(T) curve is desired.

b) The heat released by a magnetocaloric material can be also used for medical applications [A. M. Tishin, Y. I. Spichkin, V. I. Zverev, P. W. Egolf, Int. J. Refrig., Vol. 68 (2016) 177-186]. A bioactive substance absorbed in a thermo-sensitive polymer can be locally released in a controlled way in a certain place of the human body by means of core-shell composite particles consisting of a magnetocaloric particle (or core) coated by the thermo-sensitive polymer. The increase in temperature of the magnetocaloric particle is obtained by applying an external magnetic field change. Another medical application is the local heating to destroy malignant neoplasms.

c) A magnetocaloric material with a giant magneto-caloric effect associated to a magneto-elastic transition that can be also used in a mechanocaloric heater or refrigerator system due to also exhibits significant barocaloric and elastocaloric effects. In mechano-caloric devices the working substance gets cooled or heated due to the application of an external mechanical stimulus such as isostatic pressure or uniaxial stress. The multi-caloric apparatus simultaneously combines the magneto-caloric effect joined to the desired mechano-caloric effect for an enhancement of the caloric response. The magneto-caloric is encapsulated into a container (as example of Sn) hermetically as compressive pressure-transmitting media immerse into an inert perfluorinated liquid. The application of the stress fields makes the working substance get heat or cool around its first order magneto-elastic phase transition. In particular, the large surface area in a powdered sample is conducive to heat transfer.

In all of these applications, a large low magnetic-field induced magnetocaloric effect is desirable. This feature can be assessed by the relationship $|\Delta S_M^{peak}|/\mu_o\Delta H$ (given in $Jkg^{-1}K^{-1}T^{-1}$).

Binary $Fe_{100-x}Rh_x$ alloys, with a chemical composition close to the equiatomic one (i.e., 48≤x≤52 at. %), have the higher magnetocaloric effect (MCE) close to room temperature ever reported in terms of $\Delta T_{ad}^{max}$ [S. A Nikitin, G. Myalikgulyev, A. M. Tishin, M. P. Annaorazov, A. L. Tyurin, Phys. Lett. A, Vol. 148 (1990) 363-366; M. P. Annaorazov, K. A. Asatryan, G. Myalikgulyev, S. A. Nikitin, A. M. Tishin, A. L. Tyurin, Cryogenics, Vol. 32 (1992) 867-872; E. Stem-Taulats, A. Planes, Phys. Rev. B, Vol. 89 (2014) 214105; Enric Stern-Taulats, Adrià Gràcia-Condal, Antoni Planes, Pol Lloveras, Maria Barrio, Josep-Lluis Tamarit, Sabyasachi Pramanick, Subham Majumdar, Lluis Mañosa, Appl. Phys. Lett., Vol. 107 (2015) 152409; A. Chirkova, K. P. Skokov, L. Schultz, N. V. Baranov, O. Gutfleisch, T. G. Woodcock, Acta Materialia, Vol. 106 (2016) 15-211. In these alloys, the giant MCE is due to the first-order magneto-elastic phase transition that the chemically-ordered CsCl-type crystal structure undergoes. At a given temperature, the unit cell volume expands (or contracts, approximately one percent on heating (or cooling) changing the interatomic distances which lead to a modification in the magnetic structure from antiferromagnetic to ferromagnetic (and vice versa). [F. de Bergevin, L. Muldawer, Compt. Rend., Vol. 252 (1961) 1347; A. I. Zakharov, A. M. Kadomtseva, R. Z. Levitin, E. G. Ponyatovskii, Sov. Phys. JETP, Vol. 19 (1964) 1348].

According to the binary Fe—Rh phase diagram [J. L. Swartzendruber, Bull. Alloy Phase Diag., Vol. 5 (1984) 456-462], $Fe_{100-x}Rh_x$ alloys can exhibit a high temperature phase with the fcc crystal structure in the whole composition range, known as γ phase, which is paramagnetic (PM). Depending on the synthesis conditions the bcc α' and fcc γ magnetic phases could coexist in thermally annealed alloys (as it is frequently reported) [V. I. Zverev, A. M. Saletsky, R. R. Gimaev, A. M. Tishin, T. Miyanaga, J. B. Staunton, Appl. Phys. Lett., Vol. 108, (2016) 192405; A. Chirkova, F. Bittner, K. Nenkov, N. V. Baranov, L. Schultz, K. Nielsch, T. G. Woodcock, Acta Materialia, Vol. 131 (2017) 31-38]. The presence of the fcc γ phase in the $Fe_{100-x}Rh_x$ resulting alloy and the local stress owing to its microstructural interaction with the ordered α' phase has a strong influence on the AFM→FM (or FM→AFM) phase transition temperature and the resulting magnetocaloric response [A. Chirkova, F. Bittner, K. Nenkov, N. V. Baranov, L. Schultz, K. Nielsch, T. G. Woodcock, Acta Materialia, Vol. 131 (2017) 31-38]. Overall, in order to achieve reproducible results that were related to the magnetocaloric response of these alloys the characteristics on the structural transition should be reproducible. Thus, the starting and finishing temperatures of the transition in both directions, abruptness and total magnetization change. Therefore, a strict control of chemical composition, phase constitution, microstructure characteristics, and chemical order of the CsCl-type crystal structure is needed. Rapid solidification using the melt spinning technique, followed by an appropriate thermal treatment, provides a unique control over all these metallurgical features. Due to the solidification of the molten metallic mass at a very high cooling rate (~$10^6$ K/s) to form a thin ribbon (of thickness usually varying from 10 to 50 μm), the chemical composition is homogeneously reproduced in the as-solidified ribbons. In addition, a properly modification of melt spinning process parameters allows the control, within certain limits, of an average grain size and the grain orientation regarding to both ribbon surfaces.

In the present invention, a magnetocaloric material based on polycrystalline $Fe_{100-x}Rh_x$ melt spun and annealed ribbons with 48≤x≤52 at. % exhibiting a giant low magnetic-field induced and table-like MCE has been synthesized by the rapid solidification of a molten alloy using the melt spinning technique. Overall, the improved magnetocaloric properties in a lower magnetic field change (<1 T) in comparison with the reported until now in the specialized literature for bulk alloys or thin films are obtained [M. Balli, D. Fruchart, D. Gignoux, A. Yekini, Negative magnetocaloric effect in $Fe_{1-x}Rh_x$ compounds, ICMR (2007); Meghmalhar Manekar, S. B. Roy, J. Phys. D: Appl. Phys., Vol. 41 (2008) 192004; Radhika Barua, Félix Jimenez-Villacorta, L. H. Lewis, J. Appl. Phys., Vol. 115 (2014) 17A903; Enric Stern-Taulats, Antoni Planes, Pol Lloveras, Maria Barrio, Josep-Lluís Tamarit, Sabyasachi Pramanick, Subham Majumdar, Carlos Frontera, Lluís Mañosa, Phys. Rev. B, Vol. 89 (2014) 214105; A. Chirkova, K. P. Skokov, L. Schultz, N. V. Baranov, O. Gutfleisch, T. G. Woodcock, Acta Materialia, Vol. 106 (2016) 15-21; M. P. Annaorazov, K. A. Asatryan, G. Myalikgulyev, S. A. Nikitin, A. M. Tishin, A. L. Tyurin, Cryogenics, Vol. 32 (1992) 867-872; A. Chirkova, F. Bittner, K. Nenkov, N. V. Baranov, L. Schultz, K. Nielsch, T. G. Woodcock, Acta Materialia, Vol. 131 (2017) 31-38]. These characteristics provokes superior and advantageous properties related to the giant magnetocaloric effect, and working temperature.

SUMMARY OF THE INVENTION

The present invention provides a magnetocaloric material exhibiting a giant magnetocaloric effect close to room temperature at a well lower applied magnetic field change, i.e., <1 Tesla, than that used for highly efficient cooling or heating (applying or removing an external magnetic field).

The magnetocaloric material according to the present invention is represented by the general chemical formula $Fe_{100-x}Rh_x$ where x falls in the range 48≤x≤52 at. % and has a chemically ordered bcc CsCl-type crystalline structure. In this crystalline structure: (a) Fe atoms carry a local magnetic moment (~3.3 μB) and they order antiferromagnetically (AFM) at temperatures below the structural transition temperature (whereas Rh atoms do not carry a magnetic moment); (b) Fe atoms slightly reduce the magnetic moment to ~$3.2\mu_B$ and Rh atoms exhibit a magnetic moment of ~$0.9\mu_B$ and both couple ferromagnetically (FM) above the structural transition temperature.

The magnetocaloric material according to the present invention is formed by the rapid solidification into ribbons with an average thickness varying between 10 and 50 μm. For practical applications, the large surface-to-volume ratio of the ribbon shape is a crucial advantage of the present material since it allows an efficient heat exchange between the magnetocaloric material and the surrounding media. Said material is polycrystalline being composed of micronic grains with average size ranging from 2 to 150 μm.

The invention also comprises a method for the manufacture of said magnetocaloric materials, comprising the step of its fabrication by rapid solidification using the melt-spinning technique to form a polycrystalline ribbon made of micronic in size grains followed by a high temperature thermal treatment. For instance, the magnetocaloric material of the present invention can be produced, by the following method:

a) Melting the raw metals (namely Rh and Fe, of purity of 99.9% and over), according to the general chemical formula $Fe_{100-x}Rh_x$ where x falls in the range 48≤x≤52 at. %, by arc (or suction casting) or induction melting techniques in a crucible to obtain an ingot by solidification of the molten mass. This process is usually carried out in an Ar or He atmosphere;

b) Melting again the obtained ingot by induction melting into a quartz or boron nitride crucible having a circular (diameter 0.5-0.7 mm) or rectangular nozzle (width 0.5-0.7 mm; length 1-7 mm) and ejecting the molten alloy onto the polished surface of a large mass cooper wheel that rotates at a linear speed that can vary between 10 and 50 m/s to form the polycrystalline ribbons. The process can be carried out either in Ar or He atmosphere (or vacuum);

c) Heat-treating the as-solidified ribbons in a temperature range from 900 to 1100° C., for a few seconds to 72 hours. After these thermal treatment ribbons are immersed into oil, iced or room temperature water.

The magnetocaloric material is used for heating and cooling by applying mechanical stimulus such as isostatic pressure or uniaxial stress.

DETAILED DESCRIPTION OF THE INVENTION

Figure 1:
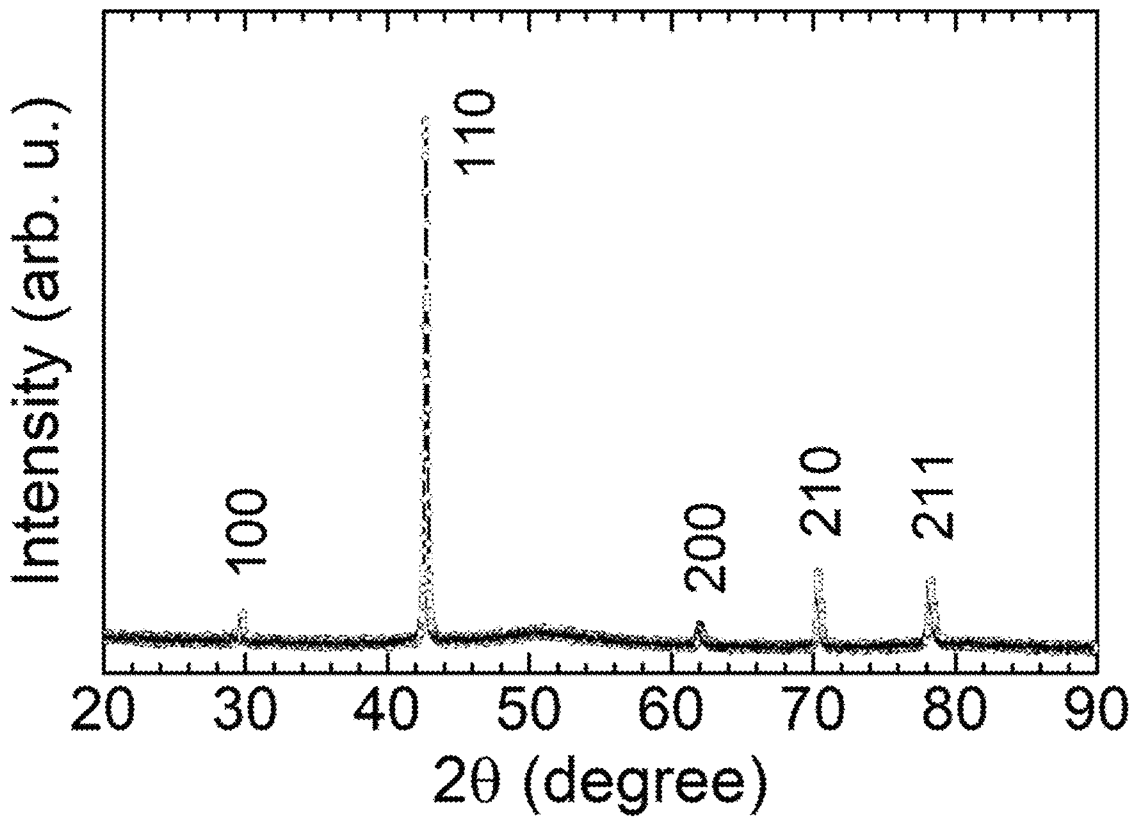
FIG. 1 shows the experimental room temperature X-ray diffraction pattern determined of thermally annealed $Fe_{49.5}Rh_{50.5}$ ribbons. As shown, all the Bragg reflections in the pattern were indexed on the basis of a single phase with the bcc CsCl-type (B2) crystal structure.

The present invention is related to the abovementioned refrigeration and medical applications associated to the heating and cooling of a magnetocaloric material by the action of an external magnetic field.

The instant invention is related to a polycrystalline magnetocaloric material based on thermally annealed $Fe_{100-x}Rh_x$ melt-spun ribbons with a Rh content x in the interval 48x52 at. % and the chemically-ordered bcc CsCl-type crystal structure (also referred as B2) that shows a giant magnetocaloric effect upon the application of a low applied magnetic field change.

In the abovementioned general formula, the x increased (within the established composition limit), the thermal treatment temperature and time and the substitution of Rh by small amounts of Pd, Cu or Au, are effective to reduce the magneto-structural transition temperature $T_t$ that can be adjusted in a wide temperature interval around room temperature ($260\leq T_t\leq 380$ K). $T_t$ can be determined either from the peak of the endothermic (exothermic) DSC scan or the maximum of the $|dM/dT(T)|^{max}$ of the measured M(T) curve under a low magnetic field strength $\mu_o H$.

This material has improved magnetocaloric properties, i.e., giant low magnetic field-induced maximum magnetic entropy $|\Delta S_M^{peak}|$ and adiabatic temperature $\Delta T_{ad}^{max}$ changes, linked to its first-order magneto-elastic phase transition when compared with bulk alloys of similar chemical composition manufactured by conventional melting techniques. In addition, this shows an enhanced refrigerant capacity RC close to room temperature owing to its table-like magnetic entropy change as a function of temperature $\Delta S_M(T)$ curve.

In said material the bcc CsCl-type (B2) crystal structure (Pearson Symbol: cP2; Space Group: Pm-3m) undergoes a temperature-induced unit cell volume change around 1% at 320-340 K that changes the magnetic structure on heating (cooling) from AFM to FM (FM to AFM). The first-order transition in both directions (i.e., heating or cooling), is accompanied by an abrupt change in magnetization, ΔM ($120\ Am^2\ kg^{-1}\leq\Delta M\leq 135\ Am^2\ kg^{-1}$). In addition, they are also sensitive to the application of an external magnetic field (i.e., both can be induced by the magnetic field). For the AFM to FM transition (this is, on heating), the material of the present invention displays a flattened magnetic entropy change curve at $\mu_o\Delta H>1$ T with $|\Delta S_M^{peak}|$ of 15.9 $Jkg^{-1}K^{-1}$ and a working temperature range $\delta T_{FWHM}=17$ K, whereas the integral refrigerant capacity RC-2 and the estimated maximum adiabatic temperature change $\Delta T_{ad}^{max}$ are 238 $Jkg^{-1}$ and 14.6 K, respectively, at $\mu_o\Delta H=2$ T. For the FM to AFM transition (this is, on cooling), said material at $\mu_o\Delta H=2$ T exhibits $|\Delta S_M^{peak}$ 1$=14.4\ Jkg^{-1}K^{-1}$, $\delta T_{FWHM}=18$ K, RC-2=231 $Jkg^{-1}$ and $\Delta T_{ad}^{max}=13.1$ K values. A distinctive feature of the alloys of the present invention is the large low-magnetic field which has induced a magnetocaloric effect, that has been evaluated through the relationship $|\Delta S_M^{peak}|/\mu_o\Delta H$ ($Jkg^{-1}K^{-1}T^{-1}$).

The material according to the present invention is useful as working substance in magnetocaloric refrigerators or winter heaters, and for medical applications linked to heat release such as controllable delivery and release of bioactive substances imbedded in a thermo-sensitive polymer coating the same and local heating to destroy malignant neoplasms.

Alloy Constitution

The melt-spun samples of the present invention were produced from pure metallic elements (≥99.9%). In the melt-spun ribbons of the magnetocaloric alloys, that according to the present invention are represented by the general chemical formula $Fe_{100-x}Rh_x$ where x falls in the range $48\leq x\leq 52$ at. %, energy dispersive spectroscopy (EDS) analyses confirm that the starting chemical composition has been replicated in the ribbon specimens. In addition, melt-spun ribbon samples crystallize into a single-phase with the chemically ordered bcc CsCl-type crystalline structure; the indexed room temperature X-ray diffraction (XRD) pattern for alloy ribbons with a $Fe_{49.5}Rh_{50.5}$ composition, shown in FIG. 1, is an example of this; in this case, the cell parameter is a=2.987 Å.

Thermal and Magnetic Properties

Figure 2A:
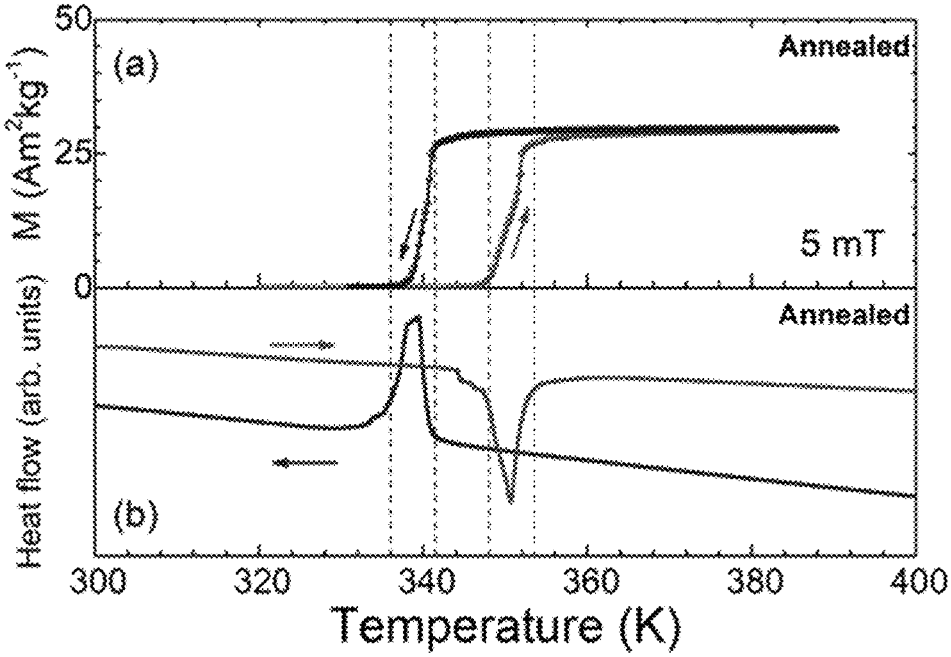
FIG. 2A shows the zero-field cooled (ZFC) and field-cooled (FC) magnetization as a function of temperature M(T) curves measured under a static magnetic field of 5 mT. The vertical dashed lines indicate the temperature range of the heating and cooling transitions.
Figure 2B:
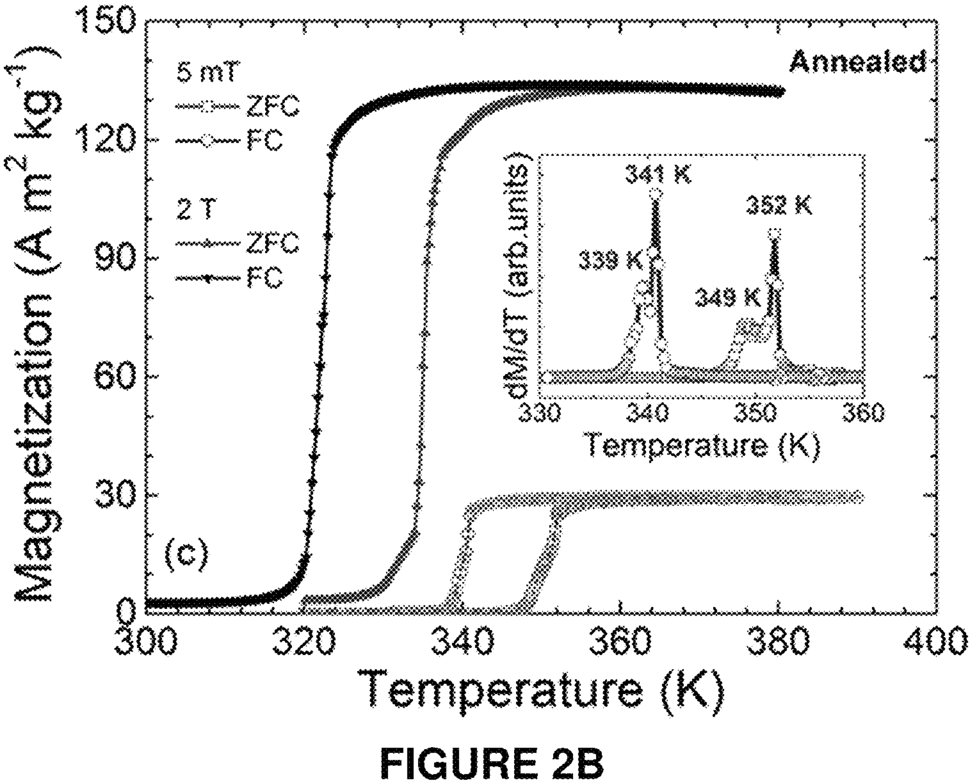
FIG. 2B shows the heating/cooling differential scanning calorimetry (DSC) scans. The vertical dashed lines indicate the temperature range of the heating and cooling transitions; The ZFC and FC M(T) curves measured under static magnetic fields of 5 mT and 2 T (c) of thermally annealed $Fe_{49.5}Rh_{50.5}$ ribbons. Inset in FIG. 2B dM/dT vs T curves at 5 mT through the AFM→FM (blue open squares) and FM→AFM (brown open circles) transitions, respectively.

FIGS. 2A and 2B show the low magnetic field ZFC and FC M(T) and heat flow DSC curves that were measured far in an alloy of the present instant invention, namely $Fe_{49.5}Rh_{50.5}$. These graphs reveal that the temperature $T_t$ for the AFM→FM and FM→AFM phase transitions [determined from both methods; for instance, the dM/dT vs T curves at 5 mT, shown at the inset of FIG. 2B] are approximately located at 352 K and 341 K, respectively. Notice that the obtained results from both methods are in good agreement. The ZFC and FC M(T) curves measured under a large magnetic field of 2 T. The insert in FIG. 2B, show a sharp magnetization change of 134 $Am^2$ kg at both phase transitions. For the sake of comparison, the M(T) curves at 5 mT are also plotted.

Magnetocaloric Properties

Figure 3A:
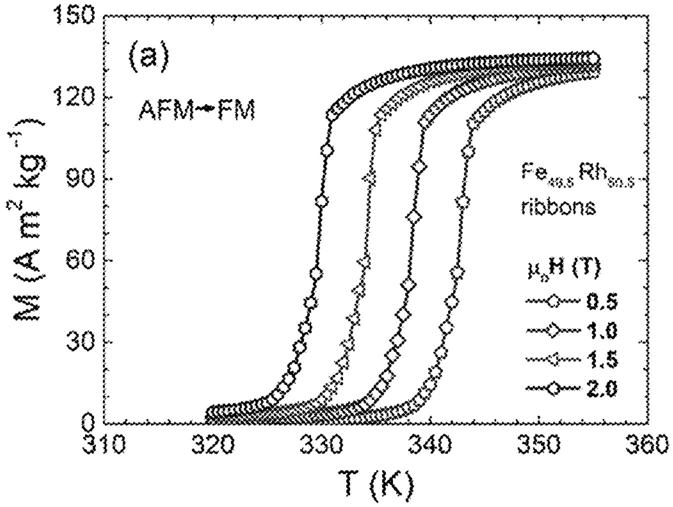
FIG. 3A shows a typical isofield magnetization curves measured under magnetic fields from 0.5 to 2.0 T (each 0.5 T) through the AFM→FM (heating)
Figure 3B:
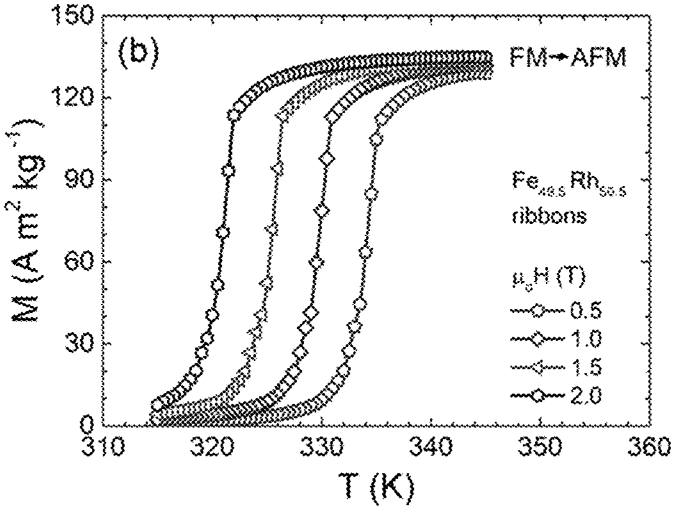
FIG. 3B shows a typical isofield magnetization curves measured under magnetic fields from 0.5 to 2.0 T (each 0.5 T) through the FM→AFM (cooling)

The magnetocaloric effect was mainly evaluated from the temperature dependence of the magnetic entropy change, the $\Delta S_M(T)$ curves, that were obtained for several magnetic field change values, $\mu_o\Delta H$, from 0.5 to 2 T. For such a purpose, sets of isofield M(T) curves were measured, the examples of such M(T) curves are shown in FIGS. 3A and 3B. $\Delta S_M(T)$ curves were obtained from a numerical integration of the Maxwell relation, $$\Delta S_M(T,\mu_o\Delta H)=\mu_o\int_0^{\mu_o H_{max}}\left[\frac{\partial M(T,\mu_o H')}{\partial T}\right]_{\lambda_o H'}dH'.$$

The magnetic field was applied along the major length of the magnetically studied ribbon specimens in order to minimize the internal demagnetizing magnetic field. Moreover, the refrigerant capacity RC was estimated from the following criteria: (a) RC-1=$|\Delta S_M^{peak}|\times\delta T_{FWHM}$, where $\delta T_{FWHM}$ is the full-width at half-maximum of the $\Delta S_M$(T) curve, i.e., $\delta T_{FWHM}=T_{hot}-T_{cold}$; (b) from the area below the $\Delta S_M$(T) curve between the temperatures $T_{cold}$ and $T_{hot}$. This is, RC-2=$\int_{cold}^{hot}[\Delta S_M(T,\mu_o\Delta H)]_{\mu_o\Delta H}\,dT$, and; (c) by maximizing the product $|\Delta S_M|\times\delta T$ below $\Delta S_M$(T) curve, usually referred as RC-3 or Wood and Potter method [M. E. Wood, W. H. Potter, Cryogenics, Vol. 25 (1985) 667-683]. RC assesses the amount of heat that the magnetocaloric material can transfer from the cold to the hot sinks if an ideal refrigeration cycle is considered.

Figure 3C:
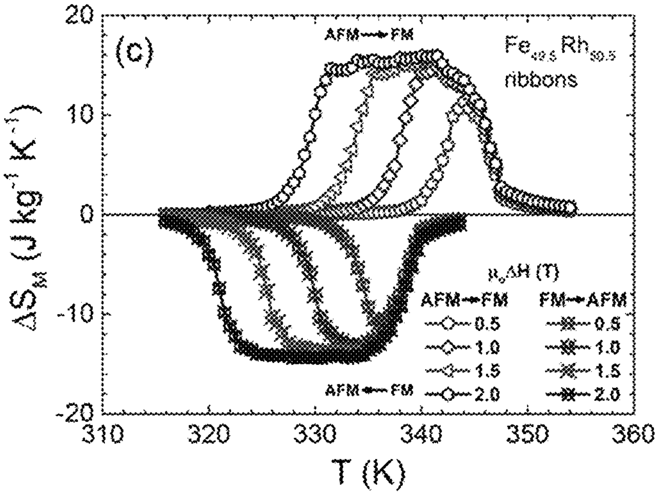
FIG. 3C shows transitions and the corresponding $\Delta S_M(T)$ curves for the same magnetic field change values.

FIG. 3C shows the $\Delta S_M$(T) curves linked to the AFM→FM and FM→AFM transitions for magnetic field changes of 0.5, 1.0, 1.5 and 2.0 T.

Figure 4A:
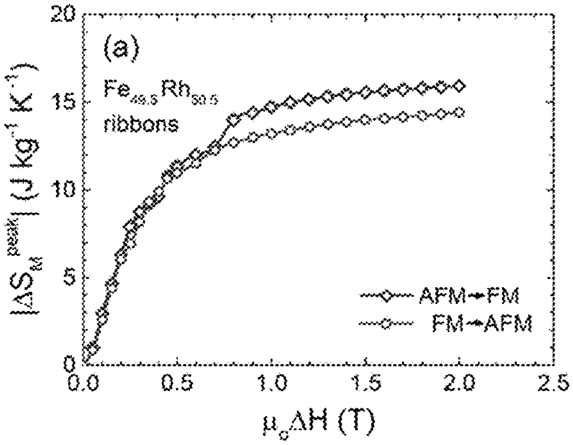
FIG. 4A shows (a) the $|\Delta S_M^{peak}|$ versus $\mu_o\Delta H$ dependence through AFM→FM (on heating) and FM→AFM (on cooling) transitions.
Figure 4B:
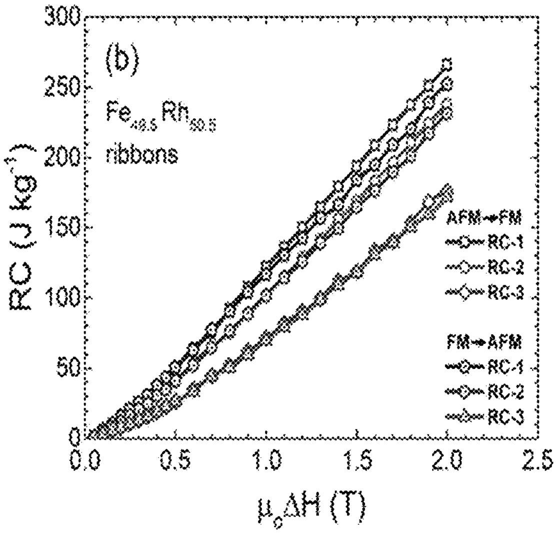
FIG. 4B shows the dependence of the refrigerant capacities RC-1, RC-2 and RC-3 on $\mu_o\Delta H$ for the heating and cooling phase transitions.
Figure 4C:
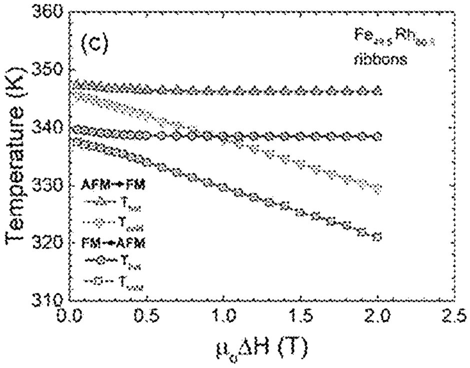
FIG. 4C shows a dependence of the temperatures $T_{hot}$ and $T_{cold}$ that define the full width at half maximum of the $\Delta S_M(T)$ curve with $\mu_o\Delta H$ for both transitions.

FIG. 4A shows the magnetic field change dependence of $1\Delta S_M^{peak}|$ for both transitions. A large $|\Delta S_M^{peak}|$ value is obtained for a low $\mu_o\Delta H$ value (between 0.4 and 1.0 T). For $\mu_o\Delta H$=2.0 T, $|\Delta S_M^{peak}|$ reaches 15.9 and 14.4 $Jkg^{-1}K^{-1}$, while the values estimated of $\Delta T_{ad}^{max}$, assuming that $\Delta T_{ad}^{max}=(T_t/c_o)|\Delta S_M^{peak}|$ (where $T_t$ is the temperature at which the magneto-elastic transition occurs and $c_o$ is the specific heat just before or after the transition [A. Chirkova, K. P. Skokov, L. Schultz, N. V. Baranov, O. Gutfleisch, T. G. Woodcock, Acta Materialia, Vol. 106 (2016) 15-21]), are 14.6 K and 13.1 K, respectively. RC-1, RC-2 and RC-3 as a function of $\mu_o\Delta H$ are given in FIG. 4B; for $\mu_o\Delta H$=2 T, the obtained RC-2 values for heating and cooling transitions were 238 $Jkg^{-1}K^{-1}$ and 231 $Jkg^{-1}K^{-1}$, respectively. FIG. 4C shows magnetic the field change dependence of the temperatures $T_{hot}$ and $T_{cold}$.

Figure 4D:
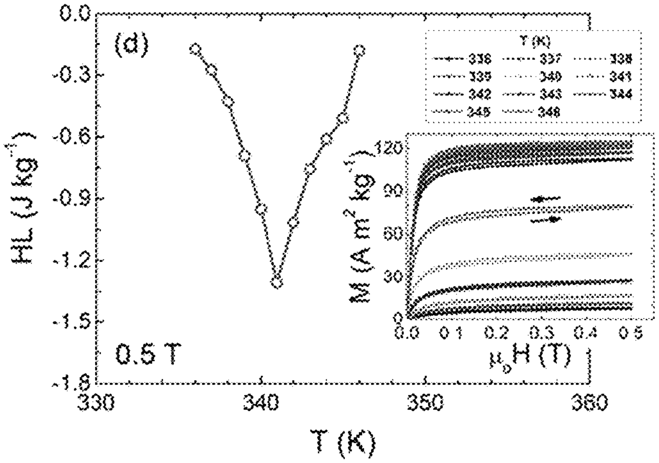
FIG. 4D shows a thermal dependence of the hysteresis loss measured at $\mu_o\Delta H=0.5$ T for the FM→AFM transition. Inset in (d) shows the isothermal magnetization curves that were measured increasing the magnetic field up to 0.5 T and removing it down to 0 T. As shown, negligible hysteresis loss has been obtained.

The inset of FIG. 4D shows the isothermal magnetization curves measured at the temperature range of the FM→AFM transition increasing the magnetic field up to 0.5 T and removing it down to 0 T. FIG. 4D shows the thermal dependence of the hysteresis loss HL(T) for $\mu_o\Delta H_{max}$=0.5 T originated from the effect of the field on the transition. The average hysteresis loss <HL> in the $\delta T_{FWHM}$ temperature range is negligible (i.e., 1.0 J/kg), however, ribbons show a quite large $\Delta S_M^{peak}$=11.4 $Jkg^{-1}K^{-1}$.

A summary of the magnetocaloric properties associated to the AFM→FM and FM→AFM transitions on thermally annealed $Fe_{49.5}Rh_{50.5}$ melt-spun ribbon, for several magnetic field changes ranging from 0.5 to 2.0 T, are given in TABLE I. The parameters listed are $|\Delta S_M^{peak}|$, $|\Delta S_M^{peak}|/\mu_o\Delta H$, RC-1, RC-2, <HL>, $\delta T_{FWHM}$, $T_{hot}$, $T_{cold}$, RC-3, $\delta T^{RC-3}$, $T_{hot}^{RC-3}$ and $T_{cold}^{RC-3}$.

TABLE II compares the $|\Delta S_M^{peak}|$, RC-2, $\delta T_{FWHM}$ and $|\Delta S_M^{peak}|/\mu_o\Delta H$ values of the magnetic field changes at and below 2 T obtained on thermally annealed $Fe_{49.5}Rh_{50.5}$ melt-spun ribbons at the AFM→FM and FM→AFM transitions with the available data reported in literature in bulk $Fe_{100-x}Rh_x$ alloys with x in the range 48≤x≤52 at. %. The method which was followed on estimating the $\Delta S_M$(T) curve, either from magnetization and calorimetric measurements, has been indicated. If a magnetic field change $\mu_o\Delta H^{max}$≤1 T is considered, the material of the present invention shows a large value of the relationship $|\Delta S_M^{peak}|/\mu_o\Delta H$ in comparison with the reported in literature for bulk alloys.

TABLE I

| Annealed $Fe_{49.5}Rh_{50.5}$ melt-spun ribbon alloys | AFM→FM transition (i.e., on heating) | | | | FM→AFM transition (i.e., on cooling). | | | |
|---|---|---|---|---|---|---|---|---|
| $\mu_o\Delta H$ (T) | 0.5 | 1.0 | 1.5 | 2.0 | 0.5 | 1.0 | 1.5 | 2.0 |
| $|\Delta S_M^{peak}|$ (J $kg^{-1}$ $K^{-1}$) | 11.4 | 14.7 | 15.6 | 15.9 | 11.0 | 13.2 | 14.0 | 14.4 |
| $|\Delta S_M^{peak}|/\mu_o\Delta H$ ($Jkg^{-1}K^{-1}T^{-1}$) | 22.8 | 14.7 | 10.4 | 7.95 | 22.0 | 13.2 | 9.3 | 7.2 |
| RC-1 (J $kg^{-1}$) | 49 | 122 | 194 | 266 | 51 | 117 | 184 | 252 |
| RC-2 (J $kg^{-1}$) | 40 | 102 | 169 | 238 | 41 | 102 | 165 | 231 |
| <HL> (J $kg^{-1}$) | — | — | — | — | 1 | — | — | — |
| $\delta T_{FWHM}$ (K) | 5 | 8 | 12 | 17 | 5 | 10 | 14 | 18 |
| $T_{hot}$ (K) | 347 | 346 | 346 | 346 | 339 | 339 | 339 | 339 |
| $T_{cold}$ (K) | 342 | 338 | 334 | 329 | 334 | 329 | 325 | 321 |
| RC-3 (J $kg^{-1}$) | 26 | 71 | 119 | 176 | 27 | 70 | 118 | 172 |
| $\delta T^{RC-3}$ (K) | 3 | 6.9 | 11 | 13 | 3 | 7 | 11 | 15 |
| $T_{hot}^{RC-3}$ (K)* | 346 | 346 | 345 | 344 | 338 | 337 | 337 | 337 |
| $T_{cold}^{RC-3}$ (K)* | 343 | 339 | 334 | 331 | 335 | 330 | 326 | 322 |

Isofield M(T)
*related to RC-3.

TABLE II

| Alloy | $\mu_o\Delta H$ (T) | $|\Delta S_M^{peak}|$ ($Jkg^{-1}K^{-1}$) | RC-2 ($Jkg^{-1}$) | $\delta T_{FWHM}$ (K) | $|\Delta S_M^{peak}|/\mu_o\Delta H$ ($Jkg^{-1}K^{-1}T^{-1}$) | Method | Transition | REF. |
|---|---|---|---|---|---|---|---|---|
| $Fe_{49.5}Rh_{50.5}$ | 0.5 | 11.4 | 40 | 5 | 22.8 | M(T) | AFM→FM | Present |
| ribbons | 1.0 | 14.7 | 102 | 8 | 14.7 | isofield | (heating) | invention |
| | 1.5 | 15.6 | 169 | 12 | 10.4 | | | |
| | 2.0 | 15.9 | 238 | 17 | 7.95 | | | |
| | 0.5 | 11.0 | 41 | 5 | 22.0 | M(T) | FM→AFM | |
| | 1.0 | 13.2 | 102 | 10 | 13.2 | isofield | (cooling) | |
| | 1.5 | 14.0 | 165 | 14 | 9.3 | | | |
| | 2.0 | 14.4 | 231 | 18 | 7.2 | | | |

TABLE II-continued

| Alloy | $\mu_o\Delta H$ (T) | $\lvert\Delta S_M^{peak}\rvert$ ($Jkg^{-1}K^{-1}$) | RC-2 ($Jkg^{-1}$) | $\delta T_{FWHM}$ (K) | $\lvert\Delta S_M^{peak}\rvert/\mu_o\Delta H$ ($Jkg^{-1}K^{-1}T^{-1}$) | Method | Transition | REF. |
|---|---|---|---|---|---|---|---|---|
| $Fe_{50}Rh_{50}$ bulk | 2.0 | 16.3 | 201 | 15 | 8.2 | M($\mu_o$H) isotherms | AFM→FM | [1] |
| $Fe_{49.3}Rh_{50.7}$ bulk | 0.5 | 6.1 | 40 | 8 | 12.2 | M(T) isofield | AFM→FM | [2] |
| | 1.0 | 11.5 | 88 | 10 | 11.5 | | | |
| | 1.5 | 13.3 | 145 | 13 | 8.8 | | | |
| | 2.0 | 13.6 | 210 | 18 | 6.8 | | | |
| $Fe_{49.2}Rh_{50.8}$ bulk | 2.0 | 14.7 | 189 | 15 | 7.4 | M(T) isofield | AFM→FM | [3] |
| $Fe_{48.9}Rh_{51.1}$ bulk | 2.0 | 11.9 | 199 | 19 | 6.0 | M(T) isofield | AFM→FM | |
| $Fe_{48.7}Rh_{51.3}$ bulk | 2.0 | 10.7 | 170 | 19 | 5.4 | M(T) isofield | AFM→FM | |

REFERENCES OF THE TABLE II
[1] Radhika Barua, Félix Jiménez-Villacorta, L. H. Lewis, J. Appl. Phys., Vol. 115 (2014) 17A903.
[2] A. Chirkova, K. P. Skokov, L. Schultz, N. V. Baranov, O. Gutfleisch, T. G. Woodcock, Acta Materialia, Vol. 106 (2016) 15-21.
[3] A. Chirkova, F. Bittner, K. Nenkov, N. V. Baranov, L. Schultz, K. Nielsch, T. G. Woodcock, Acta Materialia, Vol. 131 (2017) 31-38

Example 1

Hereinafter, the specific method for making the magnetocaloric alloys $Fe_{100-x}Rh_x$ (48≤x≤52 at. %) with ribbon shape according to the present invention will be described through the specific example of $Fe_{49.5}Rh_{50.5}$. It should be noted, however, that the present invention is in no way limited to the filling specific example.

Method for Preparing the Magnetocaloric Material.

The magnetocaloric materials of the present invention (ribbons), with a nominal composition of $Fe_{100-x}Rh_x$ (48≤x≤52 at. %), were produced from suction-casting, arc- or induction-melted bulk pellets of the same composition by rapid solidification using the melt spinning technique under the Ar (or He) atmosphere. The linear speed of the rotating copper wheel varied from 10 to 50 m/s, resulting in ribbons with thickness from 50 to 10 μm, respectively. A thermal annealing, that was carried out at temperatures between 900 and 1100° C. for a time ranging from few seconds to 72 hours, was performed in a furnace under vacuum, or Ar, or He atmosphere, or vacuum. This thermal annealing ended with a fast quenching into oil, iced or room temperature water.

Characterization Methods.

X-ray diffraction (XRD) patterns of ribbons samples were collected with a Rigaku Smartlab high-resolution diffractometer using Cu-$K_{alpha}$ radiation (λ=1.5418 Å), in the 2θ interval 20°≤2θ≤90°), with a step increment of 0.01°. The heating and cooling differential scanning calorimetry (DSC) scans were recorded using a TA Instruments model Q200 differential scanning calorimeter in absence of the applied magnetic field (temperature sweep rate of 10 $Kmin^{-1}$).

Magnetization measurements were performed in a Quantum Design PPMS© Dynacool system using the vibrating sample magnetometer option. The magnetic field μ01-1 was applied along the major ribbon length to minimize the internal demagnetizing magnetic field. Zero-field-cooled (ZFC) and field-cooled (FC) magnetization as a function of temperature M(T) curves were measured between 300 and 380 K under static magnetic fields of 5 mT and 2 T at a temperature sweep rate of 1.0 $Kmin^{-1}$.

The magnetic entropy change $\Delta S_M(T, \mu_o\Delta H)$ curves were determined from a numerical integration of the Maxwell relation, i.e., $$\Delta S_M(T, \mu_o\Delta H) = \mu_o \int_0^{\mu_o H_{max}} \left[\frac{\partial M(T, \mu_o H')}{\partial T}\right]_{\lambda_o H'} dH'.$$

For such a purpose, the sets of isofield M(T) curves, were measured with a temperature sweep rate of 1.0 $Kmin^{-1}$ under applied magnetic fields from 0.05 T to 2.0 T through both the AFM→FM and FM→AFM transitions. A fixed thermal protocol, referred elsewhere as "back and forward" [A. Quintana-Nedelcos, J. L. Sánchez Llamazares, C. F. Sánchez-Valdés, P. Álvarez Alonso, P. Gorria, P. Shamba, N. A. Morley, J. Alloys Compd., Vol. 694 (2017) 1189-1195.], was followed prior to measure each isofield M(T) curve in the temperature range of the phase transition. Considering, for instance, the AFM→FM transition, the thermal protocol was as follows: at a zero magnetic field, the sample was first heated to 380 K to stabilize the ferromagnetic phase, cooled down to 270 K to completely reach the antiferromagnetic state, and then a given magnetic field was set to record the corresponding M(T) curve on heating. In order to minimize errors in the $\Delta S_M(T)$ estimation, the magnetization versus temperature curves were measured for a large number of $\mu_o$H values. The values of RC-1, RC-2 and RC-3 were obtained from the criteria stated above (see the magnetocaloric properties section).

Example 2

Figure 5:
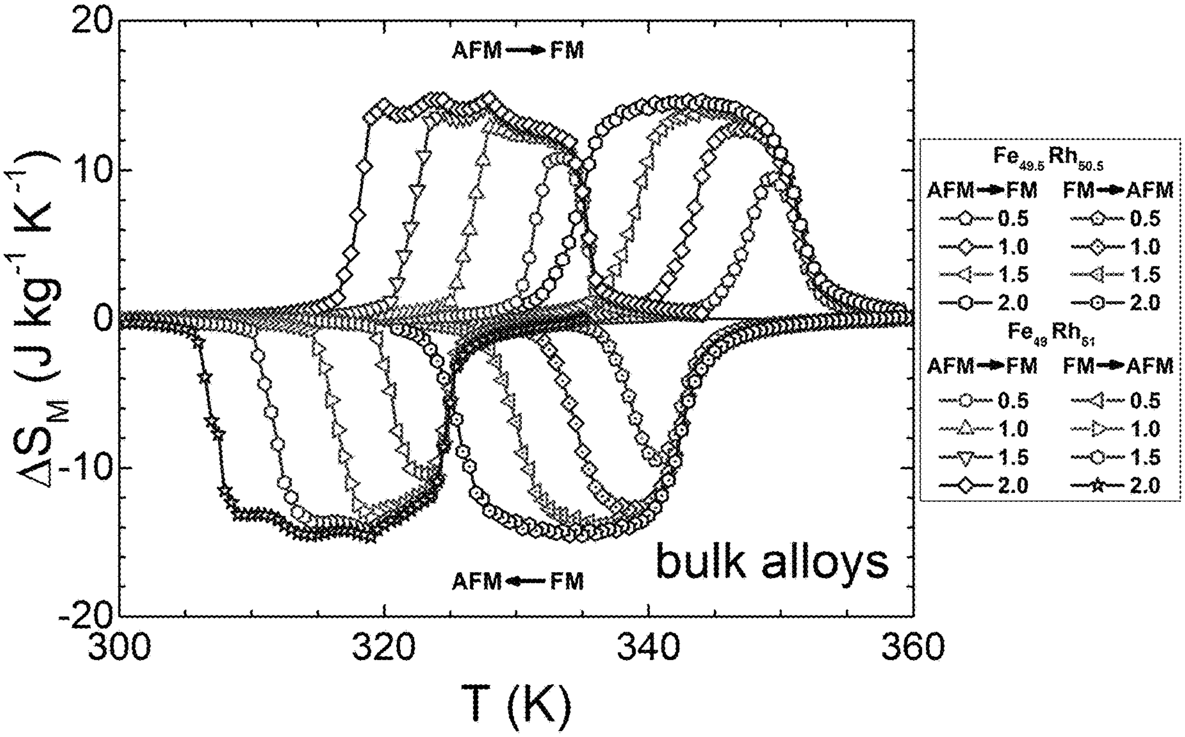
FIG. 5 shows: $\Delta S_M(T)$ curves for magnetic field change values from 0.5 to 2.0 T through the AFM→FM (heating) and FM→AFM (cooling) transitions in thermally annealed $Fe_{49.5}Rh_{50.5}$ and $Fe_{49}Rh_{51}$ bulk alloys.

After thermal annealing, bulk alloys with the chemical compositions of $Fe_{49.5}Rh_{50.5}$ and $Fe_{49}Rh_{51}$ showed a giant magnetocaloric effect in a relatively low magnetic field change associated to the first-order magneto-elastic transition in both directions (this is, through the AFM→FM transition, and vice versa). Bulk samples of both alloys can be produced by suction casting, arc melting or induction melting under an inert atmosphere (i.e., Ar or He). FIG. 5 shows the thermal dependence of the magnetic entropy change in bulk $Fe_{49.5}Rh_{50.5}$ and $Fe_{49}Rh_{51}$ alloys in both directions, whereas a summary of their magnetocaloric properties appear in TABLE III and IV, respectively. The estimated $\Delta T_{ad}^{max}$ values at $\mu_o\Delta H$=2 T are 13.9 K (13.3 K), and 13.3 K (12.7 K) across the in AFM→FM (FM→AFM) magneto-elastic phase transition in bulk $Fe_{49.5}Rh_{50.5}$ and $Fe_{49}Rh_{51}$ alloys, respectively.

TABLE III

| Annealed $Fe_{49.5}Rh_{50.5}$ bulk alloys | AFM→FM transition (i.e., on heating) | | | | FM→AFM transition (i.e., on cooling). | | | |
|---|---|---|---|---|---|---|---|---|
| $\mu_o\Delta H$ (T) | 0.5 | 1.0 | 1.5 | 2.0 | 0.5 | 1.0 | 1.5 | 2.0 |
| $\lvert\Delta S_M^{peak}\rvert$ (J kg$^{-1}$ K$^{-1}$) | 9.5 | 12.8 | 14.0 | 14.7 | 9.5 | 12.8 | 13.9 | 14.5 |
| $\lvert\Delta S_M^{peak}\rvert/\mu_o\Delta H$ (Jkg$^{-1}$K$^{-1}$T$^{-1}$) | 19.0 | 12.8 | 9.3 | 7.35 | 19.00 | 12.80 | 9.26 | 7.25 |
| RC-1 (J kg$^{-1}$) | 45 | 112 | 187 | 253 | 42 | 107 | 175 | 246 |
| RC-2 (J kg$^{-1}$) | 38 | 99 | 164 | 228 | 35 | 92 | 156 | 221 |
| <HL> (J kg$^{-1}$) | — | — | — | 66 | — | — | — | 73 |
| $\delta T_{FWHM}$ (K) | 4 | 8 | 13 | 17 | 5 | 9 | 12 | 17 |
| $T_{hot}$ (K) | 335 | 335 | 335 | 335 | 343 | 343 | 342 | 343 |
| $T_{cold}$ (K) | 331 | 327 | 322 | 318 | 338 | 334 | 330 | 326 |
| RC-3 (J kg$^{-1}$) | 25 | 73 | 128 | 182 | 22 | 63 | 111 | 165 |
| $\delta T^{RC\text{-}3}$ (K) | 3 | 6 | 11 | 15 | 3 | 7 | 10 | 14 |
| $T_{hot}^{RC\text{-}3}$ (K)* | 335 | 334 | 334 | 334 | 342 | 342 | 341 | 341 |
| $T_{cold}^{RC\text{-}3}$ (K)* | 332 | 328 | 323 | 319 | 339 | 335 | 331 | 327 |

Isofield M(T)
*related to RC-3.

TABLE IV

| Annealed $Fe_{49}Rh_{51}$ bulk alloys | AFM→FM transition (i.e., on heating) | | | | FM→AFM transition (i.e., on cooling). | | | |
|---|---|---|---|---|---|---|---|---|
| $\mu_o\Delta H$ (T) | 0.5 | 1.0 | 1.5 | 2.0 | 0.5 | 1.0 | 1.5 | 2.0 |
| $\lvert\Delta S_M^{peak}\rvert$ (J kg$^{-1}$ K$^{-1}$) | 10.8 | 12.9 | 14.4 | 14.8 | 10.4 | 13.3 | 14.3 | 14.6 |
| $\lvert\Delta S_M^{peak}\rvert/\mu_o\Delta H$ (Jkg$^{-1}$K$^{-1}$T$^{-1}$) | 21.6 | 12.90 | 9.60 | 7.40 | 20.80 | 13.30 | 9.53 | 7.30 |
| RC-1 (J kg$^{-1}$) | 45 | 112 | 187 | 253 | 45 | 113 | 186 | 254 |
| RC-2 (J kg$^{-1}$) | 38 | 99 | 164 | 228 | 39 | 98 | 165 | 230 |
| <HL> (J kg$^{-1}$) | — | — | — | 87 | — | — | — | 85 |
| $\delta T_{FWHM}$ (K) | 4 | 8 | 13 | 17 | 4 | 9 | 13 | 18 |
| $T_{hot}$ (K) | 335 | 335 | 335 | 335 | 325 | 325 | 325 | 325 |
| $T_{cold}$ (K) | 331 | 327 | 322 | 318 | 321 | 316 | 312 | 307 |
| RC-3 (J kg$^{-1}$) | 25 | 73 | 128 | 182 | 26 | 70 | 127 | 184 |
| $\delta T^{RC\text{-}3}$ (K) | 3 | 6 | 11 | 15 | 4 | 7 | 11 | 16 |
| $T_{hot}^{RC\text{-}3}$ (K)* | 335 | 334 | 334 | 334 | 325 | 324 | 324 | 324 |
| $T_{cold}^{RC\text{-}3}$ (K)* | 332 | 328 | 323 | 319 | 321 | 317 | 313 | 308 |

Isofield M(T)
*related to RC-3.

The invention claimed is:

1. A magnetocaloric material comprising: a melt-spun ribbon made of a binary alloy of $Fe_{100-x}Rh_x$, wherein x is in the interval 48≤x≤52 at. %;

wherein the ribbon is a polycrystalline ribbon made of micronic grains;

wherein the magnetocaloric material has a ribbon shape; wherein the ribbon after thermal annealing shows;

for a AFM to FM magneto-elastic transition, a magnetic field induced magnetocaloric effect per magnetic field change $\lvert\Delta S_M^{peak}\rvert/\mu_o\Delta H>22.8$ Jkg-$^1$K$^{-1}$T$^{-1}$ for $\mu_o\Delta H=0.5$ T, a maximum adiabatic temperature change of 14.6 K and a refrigerant capacity RC-2 of 238 Jkg$^{-1}$K$^{-1}$ for a magnetic field change $\mu_o\Delta H=2$ T;

for a FM to AFM magneto-elastic transition, a magnetic field induced magnetocaloric effect per magnetic field change $\lvert\Delta S_M^{peak}\rvert/\mu_o\Delta H>22.0$ Jkg$^{-1}$K$^{-1}$T$^{-1}$ for $\mu_o\Delta H=0.5$ T, a maximum adiabatic temperature change of 13.1 K and a refrigerant capacity RC-2 of 231 Jkg$^{-1}$K$^{-1}$ for a magnetic field change of $\mu_0\Delta H=2$T.

2. The magnetocaloric material according to claim 1, wherein the micronic grains have an average size ranging from 2 to 150 μm.

3. The magnetocaloric material according to claim 1, wherein the ribbons of the magnetocaloric material have a thickness between 10 and 50 μm.

4. The magnetocaloric material according to claim 1, wherein the magnetocaloric material shows a magnetic field-induced magnetocaloric effect associated to a first-order phase transition in both heating and cooling directions.

5. The magnetocaloric material according to claim 4, wherein said first-order phase transitions are at a temperature interval of $260\leq T_t\leq 380$ K which includes the room temperature range.

6. The magnetocaloric material according to claim 1, wherein a first-order magnetic structure change from the AFM to FM transition, or the FM to AFM transition, is caused by a temperature-induced unit cell volume change of around 1%.

7. The magnetocaloric material according to claim 1, wherein said material shows a chemically ordered bcc CsCl-type crystal structure that undergoes a unit cell volume expansion on heating or a contraction on cooling of around 1% leading to a first-order AFM→FM (FM→AFM) transition, respectively.

8. The magnetocaloric material according to claim 1, wherein a magnetic entropy change curve shows a working temperature range $\delta T_{FWHM}$ of 17 K and 18 K at $\mu_o\Delta H=2$ T for heating and cooling transitions, respectively.

* * * * *